United States Patent
Hsiao et al.

(10) Patent No.: US 11,726,544 B2
(45) Date of Patent: Aug. 15, 2023

(54) DYNAMIC AGENT FOR MULTIPLE OPERATORS OPTIMIZATION

(71) Applicant: MEDIATEK INC., Hsinchu (TW)

(72) Inventors: Chih-Hsiang Hsiao, Hsinchu (TW); Chia-Feng Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/714,548

(22) Filed: Apr. 6, 2022

(65) Prior Publication Data

US 2022/0229487 A1    Jul. 21, 2022

Related U.S. Application Data

(63) Continuation-in-part of application No. 17/097,501, filed on Nov. 13, 2020.

(60) Provisional application No. 63/047,939, filed on Jul. 3, 2020.

(51) Int. Cl.
*G06F 1/32* (2019.01)
*G06F 1/3234* (2019.01)

(52) U.S. Cl.
CPC .................. *G06F 1/3275* (2013.01)

(58) Field of Classification Search
CPC .................................................. G06F 1/3287
See application file for complete search history.

(56) References Cited

U.S. PATENT DOCUMENTS

| 2016/0378661 | A1* | 12/2016 | Gray | G06F 11/3466 |
| | | | | 712/237 |
| 2019/0370632 | A1 | 12/2019 | Hashemi et al. | |
| 2020/0334076 | A1* | 10/2020 | Fahs | G06T 1/20 |

(Continued)

FOREIGN PATENT DOCUMENTS

| CN | 109919312 A | 6/2019 |
| CN | 110998486 A | 4/2020 |
| TW | 201225087 A1 | 6/2012 |

(Continued)

OTHER PUBLICATIONS

Combined Taiwanese Office Action and Search Report dated Jul. 7, 2022 in Patent Application No. 110118831 (with English translation of Category of Cited Documents), 8 pages.

(Continued)

*Primary Examiner* — Stefan Stoynov
(74) *Attorney, Agent, or Firm* — Oblon, McClelland, Maier & Neustadt, L.L.P.

(57) ABSTRACT

Aspects of the disclosure provide an apparatus for executing a program that involves a plurality of operators. For example, the apparatus can include an executor and an analyzer. The executor can be configured to execute the program with at least a first one of the operators loaded on a second memory from a first memory that stores the operators and to generate a signal based on a progress of the execution of the program with the first operator. The analyzer can be coupled to the executor, the first memory and the second memory, and configured to load at least a second one of the operators of the program next to the first operator stored in the first memory to the second memory before the executor finishes execution of the program with the first operator based on the signal from the executor and an executing scheme stored in the second memory.

20 Claims, 5 Drawing Sheets

(56) References Cited

U.S. PATENT DOCUMENTS

2021/0406777 A1* 12/2021 Shanmugam ......... G06F 9/5027
2022/0004399 A1   1/2022 Hsiao et al.

FOREIGN PATENT DOCUMENTS

| TW | 201835918 A | 10/2018 |
| TW | 202004497 A | 1/2020 |
| TW | 202203036 A | 1/2022 |

OTHER PUBLICATIONS

Extended European Search Report issued Nov. 12, 2021 in Patent Application No. 21183203.5.

Thierry Moreau, et al., "VTA: An Open Hardware-Software Stack for Deep Learning", Cornell University Library, XP81115846, Jul. 11, 2018, pp. 1-19.

Lita Yang, et al., "SRAM Voltage Scaling for Energy-Efficient Convolutional Neural Networks", 18$^{th}$ International Symposium on Quality Electronic Design (ISQED), IEEE, XP33091586, Mar. 14, 2017, 6 pages.

Udit Gupta, et al., "MASR: A Modular Accelerator for Sparse RNNs", 28$^{th}$ International Conference on Parallel Architectures and Compilation Techniques (PACT), IEEE, XP33649020, Sep. 23, 2019, pp. 1-14.

U.S. Appl. No. 17/097,501, filed Nov. 13, 2020, Hsiao, C.-H., et al.

Combined Taiwanese Office Action and Search Report dated Mar. 8, 2022 in Taiwanese Patent Application No. 110118831 (with English translation of Category of Cited Documents), 9 pages.

Combined Taiwanese Office Action and Search Report dated Mar. 20, 2023 in Taiwanese Patent Application No. 111121132, 6 pages.

Examination report dated Mar. 30, 2023 in European Application No. 211832035, 8 pages.

Koppula et al., Skanda; EDEN: Enabling Energy-Efficient, High-Performance Deep Neural Network Inference Using Approximate DRAM, Proceedings of the 52$^{nd}$ Annual IEEE/ACM International Symposium on Microarchitecture, Micro '52, Oct. 12, 2019, pp. 166-181, 16 pages.

* cited by examiner

DYNAMIC AGENT FOR MULTIPLE OPERATORS OPTIMIZATION

INCORPORATION BY REFERENCE

This present disclosure is a continuation-in-part of U.S. application Ser. No. 17/097,501, entitled "DYNAMIC LOADING NEURAL NETWORK INFERENCE AT DRAW/ON-BUS SRAM/SERIAL FLASH FOR POWER OPTIMIZATION," filed on Nov. 13, 2020, which claims the benefit of U.S. Provisional Application No. 63/047,939, entitled "Dynamic loading NN inference at DRAM/ON-bus SRAM/Serial Flash for power optimization," filed on Jul. 3, 2020, both of which are incorporated herein by reference in their entirety.

TECHNICAL FIELD

The present disclosure relates to memories, and, more particularly, to an apparatus and a method that can dynamically load a neural network inference stored in a memory and manage power supplied to the memory and hardware accelerators that execute the neural network inference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Neural networks (NNs) can learn from various examples of a certain task during a process called training. After learning, the task can be performed on new data during a process called inference. An NN inference can have a huge amount of weights and activations and have to be stored in a sufficiently large memory, such as a dynamic random access memory (DRAM). During the execution of the entire NN inference, the DRAM, when powered on, will consume power.

SUMMARY

Aspects of the disclosure provide an apparatus for executing a program that involves a plurality of operators. For example, the apparatus can include an executor and an analyzer. The executor can be configured to execute the program with at least a first one of the operators loaded on a second memory from a first memory that stores the operators and to generate a signal based on a progress of the execution of the program with the first operator. The analyzer can be coupled to the executor, the first memory and the second memory, the analyzer being configured to load at least a second one of the operators of the program next to the first operator stored in the first memory to the second memory before the executor finishes execution of the program with the first operator based on the signal from the executor and an executing scheme stored in the second memory.

In an embodiment, the apparatus further includes an estimator coupled to the analyzer, the first memory and the second memory, wherein the analyzer controls the estimator to manage power supplied to the first memory before the executor finishes execution of the program with the first operator based on the signal from the executor and the executing scheme stored in the second memory. For example, the estimator can manage the power supplied to the first memory by powering on/off the first memory, configuring an operation mode of the first memory, or scaling a voltage and/or a frequency applied to the first memory.

For example, the executing scheme can include a script, a rule, or a model. In an embodiment, the rule can generate a script for a certain layer of the program based on input tensors from a previous layer of the program.

For example, the signal can include an operation, a node identification (ID), a tensor, a kernel, and/or time of the program. As another example, the second memory can be a tightly-coupled memory (TCM) or a static random access memory (SRAM), and the first memory can be a dynamic random access memory (DRAM), an on-bus SRAM, or a serial flash memory.

For example, the executor can be a central processing unit (CPU) and the analyzer is a microcontroller unit (MCU) or a CPU exception, or the executor can be a deep learning accelerator (DLA) and the analyzer is an MCU.

In an embodiment, the analyzer and the executor can be included on a single chip.

In an embodiment, the apparatus can further include a direct memory access (DMA) controller coupled to the analyzer, the first memory and the second memory, wherein the analyzer is further configured to instruct the DMA controller to load the second operator stored in the first memory to the second memory.

For example, the executing scheme can be man-made or created by an offline optimizer or an online/runtime optimizer.

Aspects of the present disclosure further provide another apparatus for executing a program that involves a plurality of operators. For example, the apparatus can include a first executor, a second executor and an analyzer. The first executor can be configured to execute the program with at least a first one of the operators and to generate a signal based on a progress of the execution of the program with the first operator. The second executor can be configured to execute the program with at least a second one of the operators next to the first operator. The and analyzer can be coupled to the first executor and the second executor, the analyzer being configured to manage power supplied to the second executor before the first executor finishes execution of the program with the first operator based on the signal from the first executor and an executing scheme. For example, the second executor can be DLA or an accelerated processing unit (APU).

In an embodiment, the apparatus further includes an estimator coupled to the analyzer and the second executor, the estimator being configured to manage the power supplied to the second executor by powering on/off the second executor, configuring an operation mode of the second executor, or scaling a voltage and/or a frequency applied to the second executor.

Aspects of the present disclosure also provide a method for executing a program that involves a plurality of operators. For example, the method can include loading at least a first one of the operators from a first memory that stores the operators to a second memory. The method can also include executing the program with the first operator loaded on the second memory, and generating a signal based on a progress of the execution of the program. The method can also include loading at least a second one of the operators stored in the first memory to the second memory before execution of the program with the first operator is finished based on the signal and an executing scheme stored in the second memory.

In an embodiment, the method can further include managing power supplied to the first memory before the execution of the program with the first operator is finished based on the signal and the executing scheme stored in the second memory.

For example, the first operator and the second operator can be executed by a first executor and a second executor, respectively. In an embodiment, the method can further include managing power supplied to the second executor before the first executor finishes execution of the program with the first operator based on the signal from the first executor and the executing scheme. For example, managing the power supplied to the second executor can include powering on/off the second executor, configuring an operation mode of the second executor, or scaling a voltage and/or a frequency applied to the second executor.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1A:
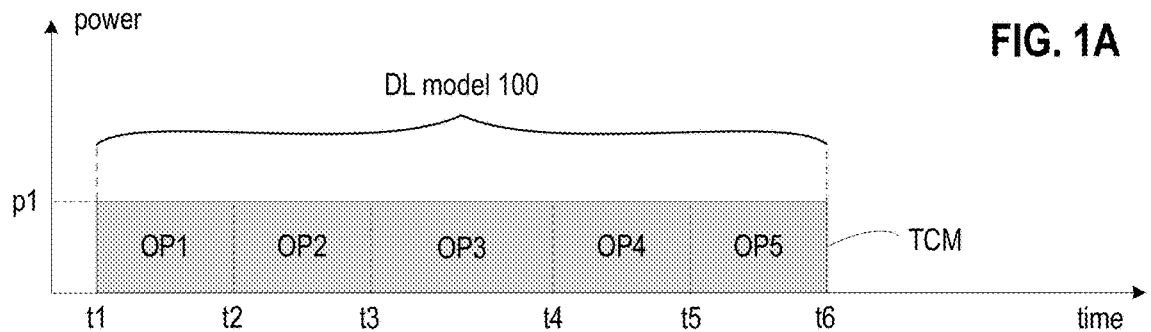
FIG. 1A is a power-timing diagram illustrating execution of a DL model on a TCM (or an SRAM)

Neural networks (NNs) can be used to extract meaningful information or features out of a huge amount of data. Without being specifically programmed, the NNs can learn from various examples of a certain task during a process called training. After learning, the task can be performed on new data during a process called inference. During training, a best set of weights that optimize the accuracy of NN inference can be estimated. An NN inference, which is a type of programs, can include a huge amount of weights and activations, and, accordingly, be too large to be stored in, for example, a tightly-coupled memory (TCM), which can have a limited bandwidth. For example, the NN inference can be stored in a dynamic random access memory (DRAM), and the NN inference will be loaded from the DRAM to the TCM portion by portion for an inference executor to execute. During the loading and execution of the entire NN inference, the DRAM is always powered on, which can consume a great amount of power. Additional latency can be incurred due to the loading of the NN inference.

The NN inference is also too large to be executed by a single, general executor. For example, the NN inference can be segmented into multiple partitions and then distributed to heterogeneous hardware, e.g., mini DLAs and APUs, to accelerate inference computation. The hardware accelerators can operate in a working mode during the execution of the NN inference. To save power consumption, the hardware accelerators can operate in a standby mode, and be switched to operate in the working mode when executing the NN inference. Additional latency is incurred due to the switching from the standby mode to the working mode.

According to some aspects of the disclosure, an analyzer and an executing scheme can be introduced. In an embodiment, the executing scheme can be used to tell the analyzer about when and how to load a portion of the program (e.g., operator(s) of a deep learning (DL) model) from the DRAM to the TCM and manage power supplied to the DRAM. For example, when the analyzer looks up the executing scheme and learns that operator(s) of a DL model needs to be loaded from the DRAM to the TCM, the analyzer can turn on the DRAM, load the operator(s) of the DL model from the DRAM to the TCM, and turn off the DRAM after the operator(s) of the DL model is loaded to the TCM. In an embodiment, the operator(s) of the DL model can be loaded to the TCM before the execution of the DL model with the previous operator is finished, to reduce the latency.

In another embodiment, the executing scheme can also tell the analyzer about when the hardware accelerators should be switched to operate from the standby mode to the working mode. For example, when the analyzer looks up the executing scheme and learns that the hardware accelerator is going to execute the DL mode with an operator, the analyzer can turn on the hardware accelerator before the execution of the DL mode with the previous operator is finished, to reduce the latency.

Deep learning (DL) has been highly successful in machine learning across a variety of application fields, such as robotics, self-driving car, augmented reality, natural language processing and big data analysis, among other things. DL models consist of various types of deep neural network (DNN), such as fully connected neural network (FCNN), convolutional neural network (CNN), auto-encoders (AE), generative adversarial network (GAN) and recurrent neural network (RNN).

In FCNN, all the neurons (or called nodes) in one layer are connected to the neurons in the next layer, and thus the output of each layer, i.e., multi-layer perceptron (MLP), is fed forward to the next layer as the input thereof. FCNN is a supervised artificial neural network, and can be used for image recognition and classification. FCNN is computationally intense and may be prone to overfitting.

CNN adds additional filtering layers where the filter weights (or called convolution kernels) can be learned in addition to the weights and biases for each neuron. CNN also adds pooling layers, which compute maximum/minimum or average of a certain number of samples, to reduce the dimensionality that is increased by the convolution operation of the filtering layers. CNN can extract features while reducing the model complexity, which mitigates the risk of overfitting, and is remarkably used for image processing.

AE is an unsupervised artificial neural network (NN), and can be used to learn efficient codings of unlabeled data. AE has two NNs stacked on each other. The first NN (i.e., an encoder) learns or encodes the representative characteristics of the input. The second NN (i.e., a decoder) takes these encoded representative characteristics as input and reconstructs the original input approximately as final output. AE can be used for dimensionality reduction and information retrieval.

GAN is also an unsupervised artificial NN that can treat an unsupervised problem as supervised with two sub-models: generator and discriminator. The generator is trained to generate samples that are intended to come from the training data, while the discriminator is trained to discriminate the samples generated as either real or fake. These two sub-models are trained together in a zero-sum game, adversarial, until finding a Nash equilibrium when the discriminator is fooled about half the time, meaning that the generator is generating plausible examples. GAN can be applied in image synthesis, including synthesizing near-perfect human faces, restoring color and quality of old videos, and generating realistic Deepfake videos.

RNN is designed especially for sequential data prediction. Each neuron in RNN not only receives information from the previous layer but also receives information from the previous channel of its own. RNN can predict future information or restore missing parts of sequential data. RNN is commonly used for ordinal or temporal problems, such as language translation, natural language processing (NLP), speech recognition, and image captioning, and is already incorporated into popular applications, such as Siri, voice search, and Google Translate.

In order to further improve the accuracy, DNNs become deeper and require extremely intensive computation and large memory footprints for a huge amount of weights and biases. To meet such computation and storage requirements, a common approach is to leverage cloud computing. However, training and inference of DL models in the cloud require devices to transmit massive amount of data to the cloud, which thus consume a large amount of network bandwidth. Real-time inference is critical to many applications. For example, a voice-based intelligent assistant application, e.g., Siri, needs to quickly parse and understand the user's query and return a response. However, sending data to the cloud and accessing cloud services, e.g., inference and training, may incur additional queuing and propagation delays from the network, and the delays may be not short enough to satisfy strict low latency requirements needed for real time, interactive applications. Besides, users who own the data risk privacy concerns to send the data to the cloud.

Edging computing is a solution to meet the cost, latency and privacy challenges described above, as edge devices are closer to users than the cloud. For example, edging computing's proximity to data sources on the end devices, such as smartphones, wearables and Internet-of-Things (IoT) devices, can decrease latency and thus enable real-time services, e.g., real-time inference. As another example, edging computing allows data to be analyzed close to the data source, thus avoiding exposure to privacy and security attacks.

However, in the end devices, there are not enough resources to support raw large-scale DL models. To meet cost and latency requirements, different mechanisms and architectures, such as model design, model compression, hardware choice, model segmentation and model frame for the end devices to perform inference quickly have been proposed.

MobileNets (e.g., MobileNet V2) is an exemplary model design proposed to reduce memory and execution latency for mobile and embedded vision applications. A spatial separable convolution can divide a larger kernel into two smaller kernels. For example, a 3×3 kernel can be separated into a 3×1 kernel and a 1×3 kernel. Therefore, instead of doing one convolution on the 3×3 kernel with 9 multiplications, two simpler convolutions can be performed on the 3×1 kernel and the 1×3 kernel with 3 multiplications each (6 multiplications in total) to achieve the same result. One of the most famous convolutions that can be separated spatially is the Sobel kernel, which can be used to detect edges. However, not all kernels can be separated exactly into two smaller kernels. A depthwise separable convolution can deal with kernels that cannot be separate exactly into two smaller kernels. MobileNets are based on a streamlines architecture that uses a depthwise separable convolution to decompose or separate convolution filters into two simpler operations, to reduce the number of computations needed. A depthwise separable convolution involves a depthwise (DW) convolution and a pointwise (PW) convolution that are performed sequentially. Different from a normal convolution, which convolves, for example, 256 5×5×3 kernels (256 is the number of channels of an output image) on a 12×12×3 image (3 is the number of channels of the (input) image, e.g., red (R), green (G) and blue (B)) with a stride of 1 to get an 8×8×256 image, a depthwise separable convolution first convolves 3 5×5×1 kernels on the 12×12×3 image in the depthwise convolution to get an intermediate 8×8×3 image, and then convolves 256 1×1×3 kernels on the intermediate 8×8×3 image in the pointwise convolution to get the 8×8× 256 image. In the normal convolution, the 256 5×5×3 kernels each move 8×8 times, resulting in 256×5×5×3×8× 8=1,228,800 multiplications. By contrast, in the depthwise separable convolution the 3 5×5×1 kernels each move 8×8 times and the 256 1×1×3 kernels each moves 8×8 times, resulting in 3×5×5×1×8×8+256×1×1×3×8×8=53,952 multiplications, which is far less than 1,228,800 multiplications.

A DNN model can be compressed in a variety of ways, such as parameter quantization (lower precision), parameter pruning (fewer weights), and knowledge distillation. Parameter quantization can approximate an existing DNN that uses floating-point numbers by a new DNN that uses low-bit width numbers, thus reducing both the memory requirement and computational cost. For example, the activation function for each convolution layer in a DNN can be replaced with a quantization function, to convert the activations to low-bit width, e.g., binary values +1 and −1 in a binary neural network (BNN), immediately prior to each convolution. Parameter pruning involves removing some redundant or less important parameters (e.g., weights) of a DNN that do not contribute a lot to the output, e.g., those that are very close to 0. Parameter pruning would make the DNN smaller while aiming to keep the accuracy of the initial larger DNN. Knowledge distillation involves creating a smaller DNN that imitates the behavior of a larger, more powerful DNN. For example, the small DNN can be trained, step by step, exactly what to do using the output predictions produced from the larger, already trained DNN.

In addition to existing central processing units (CPUs) and graphic processing units (GPUs), accelerated processing units (APUs), deep learning accelerators (DLAs, e.g., mini DLA), custom application-specific integrated circuits (ASICs) and field-programmable gate array (FPGA)-based DNN accelerators are also developed to speed up inference of deep learning. An APU combines the CPU and the GPU onto a single chip to form a combined processing unit, to reduce cost and improve efficiency. DLAs are designed and optimized, by offering specialized processing units, for increasing speed, efficiency and accuracy of computers and mobile devices that are executing deep learning algorithms. Custom ASICs can focus on efficient memory accesses in order to reduce latency and energy consumption. FPGA can produce fast computation while maintaining re-configurability. The custom ASICs and FPGA-based DNN accelerators are generally more energy efficient than the CPUs and GPUs. The metric to be used for choosing the hardware can be based on accuracy, energy consumption, through put and cost.

A DL model can be segmented into multiple partitions and then distributed to heterogeneous hardware, e.g., mini DLAs and APUs, to accelerate DL computation by alleviating the resource cost of each of them. For example, each layer of a DNN can be segmented into slices to increase parallelism and to reduce memory footprint, and these slices can be executed layer-by-layer.

Running DL models on static random access memories (SRAMs) or tightly-coupled memories (TCMs) achieves better energy savings compared to dynamic random access memories (DRAMs). TCMs are one of a variety of on-chip memories that can be typically embedded in a low power processor to accelerate the data processing in the processor.

FIG. 1A is a power-timing diagram illustrating execution of a DL model 100 on a TCM (or an SRAM). The execution of the DL model 100 starts at time t1 and ends at time t6. The DL model 100 involves a plurality of operators, e.g., operators OP1 to OP5, which are stored in the TCM. An executor can execute the DL model 100 with the operators OP1 to OP5 sequentially at time t1 to time t5, respectively. For example, the DL model 100 can include MobileNet V2, and the operators OP1 to OP5 can include 3×3 convolution, 1×1 convolution, 3×3 DW convolution, 1×1 convolution and fully convolution (FC), respectively. The execution of the DL model 100 on the TCM consumes power p1 and thus energy of p1×(t6−t1).

TCMs, though power-efficient and capable of being accessed quickly, are area expensive, so it is not cost-effective to embed a TCM of a large size in a processor. To address this issue, the operators OP1 to OP5 can be stored in a DRAM, and some of the operators OP1 to OP5 that are scheduled to be executed can be loaded from the DRAM to the TCM for the executor to execute.

Figure 1B:
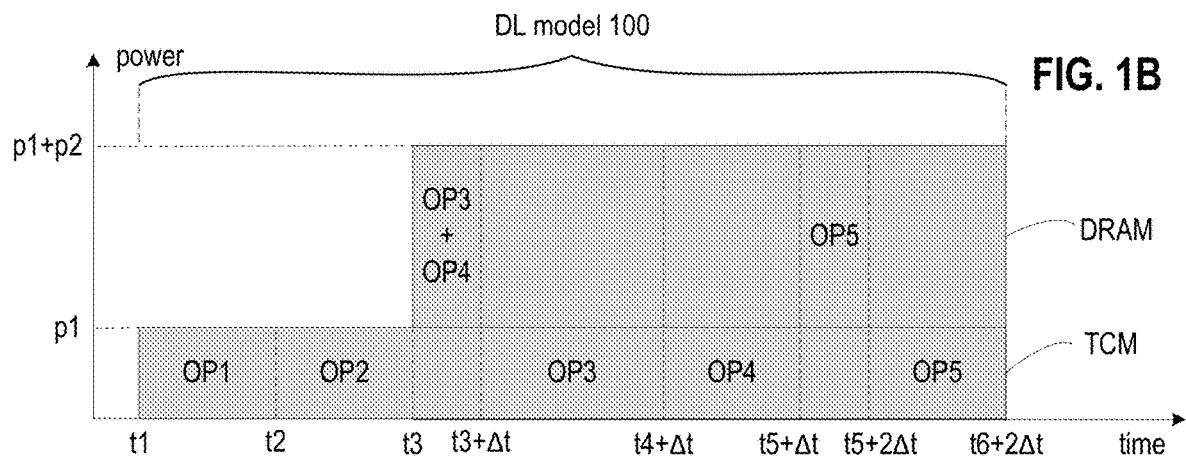
FIG. 1B is a power-timing diagram illustrating execution of the DL model on a combination of a TCM (or an SRAM) and a DRAM.

FIG. 1B is a power-timing diagram illustrating execution of the DL model 100 on a combination of a TCM (or an SRAM) and a DRAM. For example, the operators OP1 and OP2 are already stored in the TCM, which is sized to store at most two operators, and the operators OP3 to OP5 are still stored in the DRAM. The executor can start executing the DL model 100 with the operators OP1 and OP2 at time t1 and time t2, respectively. After the execution of the DL model 100 with the operators OP1 and OP2, i.e., at time t3, the executor is scheduled to execute the DL model 100 with the operators OP3 and OP4, and starts loading the operators OP3 and OP4 from the DRAM to the TCM. It takes time for the operators to be loaded from the DRAM to the TCM. For example, it takes time Δt for the operators OP3 and OP4 to be loaded from the DRAM to the TCM, and the executor cannot execute the DL model 100 with the operator OP3 until time t3+Δt, when the operator OP3 is loaded to the TCM. After the execution of the DL model 100 with the operators OP3 and OP4, i.e., at time t5+Δt, the executor is scheduled to execute the DL model 100 with the operator OP5, and starts loading the operator OP5 from the DRAM to the TCM. Similarly, it takes time Δt for the operator OP5 to be loaded from the DRAM to the TCM, and the executor will execute the operator OP5 at time t5+2Δt. Accordingly, the execution of the DL model 100 on the combination of the TCM and the DRAM starts at time t1 and ends at time t6+2Δt, with the latency (i.e., t6−t1) increased by additional 2Δt. During the loading and execution of the DL model 100 with the operators OP3 to OP5, the DRAM is always powered on and consumes, for example, power p2 continuously. Therefore, the DRAM is not powered off until time t6+2Δt, and the execution of the DL model 100 on the combination of the TCM and the DRAM consumes energy of p1×(t6−t1)+p1×2Δt+p2×(t6−t3+2Δt).

Figure 2:
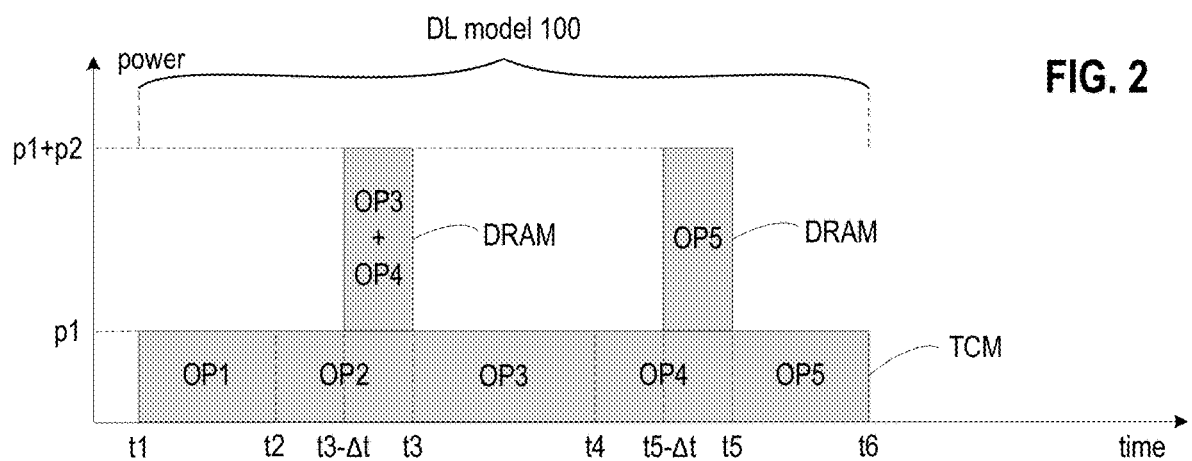
FIG. 2 is a power-timing diagram illustrating execution of the DL model on the combination of the TCM and the DRAM according to some embodiments of the present disclosure.

FIG. 2 is a power-timing diagram illustrating execution of the DL model 100 on the combination of the TCM and the DRAM according to some embodiments of the present disclosure. For example, the operators OP1 and OP2 are already stored in the TCM. In order not to increase the latency (i.e., t6−t1), the DRAM is powered on no later than time t3−Δt, when the executor can start loading the operators OP3 and OP4 from the DRAM to the TCM, and the operators OP3 and OP4 can be stored in the TCM no later than time t3; the DRAM is powered on no later than time t5−Δt, when the executor can start loading the operator OP5 from the DRAM to the TCM, and the operator OP5 can be stored in the TCM no later than time t5. Therefore, the executor can execute the DL model 100 with the operators OP3 and OP5 right after finishing the executions of the DL model 100 with operators OP2 and OP4, respectively, and the execution of the DL model 100 can end at time t6, no additional latency incurred.

In order to save the energy consumed, the DRAM can be powered off right after the operator(s) is loaded to and stored in the TCM. For example, the DRAM is powered on at time t3−Δt, when the loading of the operators OP3 and OP4 from the DRAM to the TCM starts, powered off at time t3, when the loading of the operators OP3 and OP4 from the DRAM to the TCM ends, powered on again at time t5−Δt, when the loading of the operator OP5 from the DRAM to the TCM starts, and powered off again at time t5, when the loading of the operator OP5 from the DRAM to the TCM ends. Therefore, the execution of the DL model 100 on the combination of the TCM and the DRAM consumes energy p1×(t6−t1)+p2×2Δt, which is p1×2Δt+p2×(t6−t3) less than the energy consumed by the execution of the DL model 100 illustrated in FIG. 1B.

Figure 3:
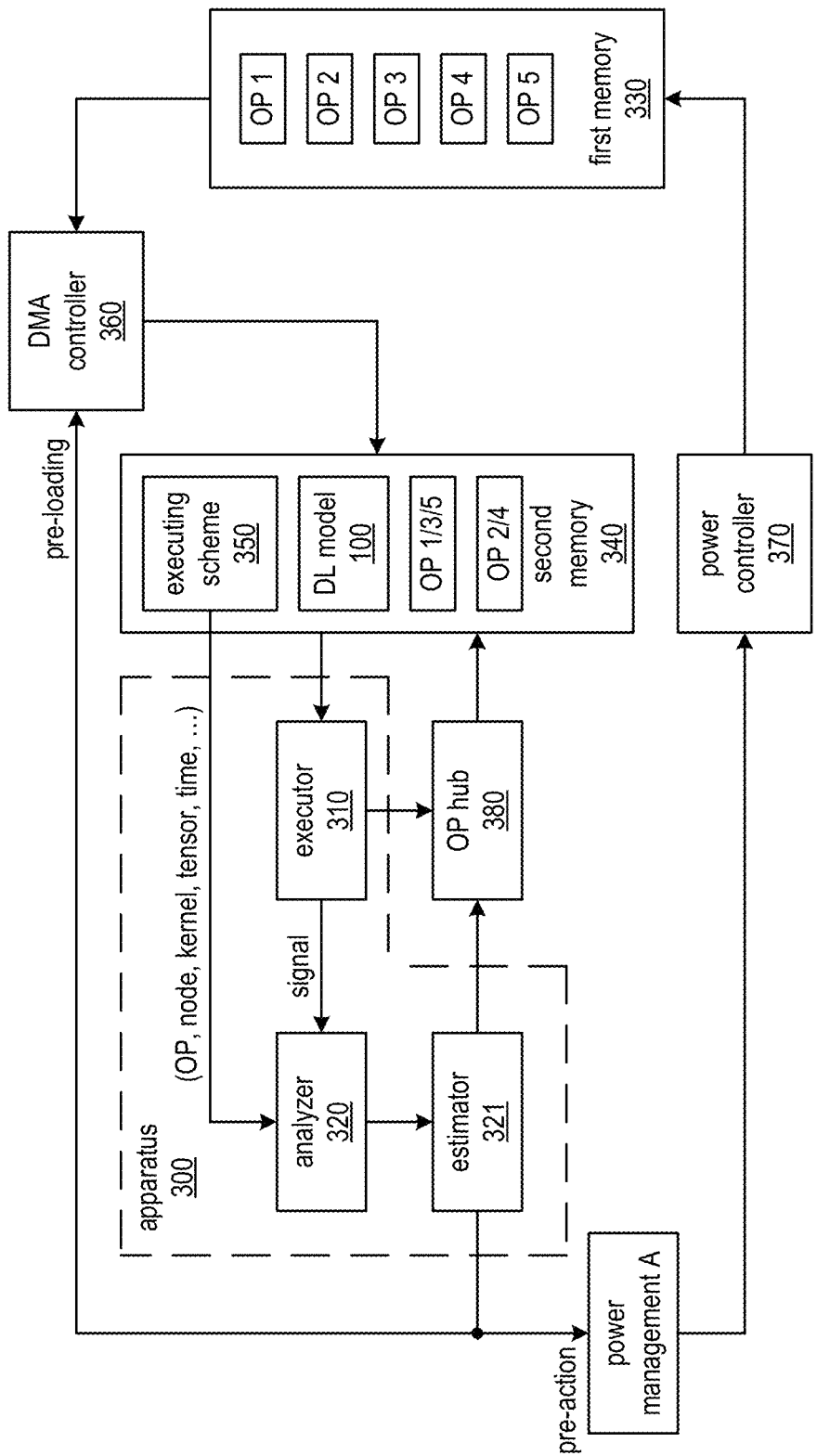
FIG. 3 is a functional block diagram of an exemplary apparatus for executing a program, e.g., the DL model shown in FIGS. 1A, 1B and 2, according to some embodiments of the present disclosure.

FIG. 3 is a functional block diagram of an exemplary apparatus 300 for executing a program (e.g., the DL model 100) according to some embodiments of the present disclosure. For example, the apparatus 300 can be a smartphone, a wearable or any IoT device. In an embodiment, the apparatus 300 can include an executor 310 (e.g., an inference executor), an analyzer 320 coupled to the executor 310, and an estimator 321 coupled to the analyzer. The executor 310, the analyzer 320 and the estimator 321 can include software and/or hardware. In an embodiment, the executor 310, the analyzer 320 and the estimator 321 can be included on a single chip. In another embodiment, the executor 310, the analyzer 320 and the estimator 321 can be three distinct chips. For example, the executor 310 can be a CPU or a DLA, and the analyzer 320 can be a microcontroller unit (MCU) or CPU exception. As another example, the executor 310 can be a CPU that is set with an interrupt descriptor table, and the analyzer 320 can perform a specific exception handler function listed in the interrupt descriptor table when an exception occurs and the CPU interrupts its current works.

In an embodiment, the analyzer 320 and the estimator 321 can be coupled between a first memory 330 and a second memory 340. In an embodiment, the first memory 330 can be used to store a program, such as a DL model that involves a plurality of operators OP1 to OP5, e.g., 3×3 convolution, 1×1 convolution, 3×3 DW convolution, 1×1 convolution and FC. For example, the first memory 330 can be a DRAM, an on-bus SRAM, or a serial flash memory. In another embodiment, the second memory 340 can be used to store at least one of the operators OP1 to OP5 loaded from the first memory 330. For example, the second memory 340 can be a TCM or an SRAM.

The executor 310 can be further coupled to the second memory 340. The executor 310 can execute the DL model 100 with the operator(s) loaded on the second memory 340 and switched by an OP hub 380, and generate a signal based on a progress of the execution of the DL model 100 with the operator(s). For example, the signal can include a node identification (ID) of the operation.

In an embodiment, an executing scheme (or descriptor) 350 can also be stored in the second memory 340. For example, the executing scheme 350 can include a script, a rule, or a model. In an embodiment, the executing scheme 350 can be a script, and the analyzer 320 can be a script player. In another embodiment, the rule can generate a script for a certain layer of a program (e.g., the DL model 100) based on input tensors from a previous layer of the program. The analyzer 320 can load, via a direct memory access (DMA) controller 360, for example, the operators OP1 to OP5 from the first memory 330 to the second memory 340 and control the estimator 321 to manage power supplied to the first memory 330 based on the signal and the executing scheme 350. In an embodiment, the estimator 321 can enable the power controller 370 to manage the power supplied to the first memory 330 by powering on/off the first memory 330. In another embodiment, the estimator 321 can enable the power controller 370 to manage the power supplied to the first memory 330 by configuring an operation mode of the first memory 330. For example, the estimator 321 can enable the power controller 370 to configure the first memory 330 to operate at a high-performance mode by scaling the data rate and row cycle time of the first memory 330. In some other embodiments, the estimator 321 can enable the power controller 370 to manage the power supplied to the first memory 330 by dynamically scaling a voltage and/or a frequency applied to the first memory 330 (DVFS), as the power consumption is proportional to $V^2 \times f$. For example, the estimator 321 can manage the power supplied to the first memory 330 by reducing the voltage applied to the first memory 330. Although reducing voltage may increase the propagation delay of signals, which can cause errors when using unmodified timing parameters, e.g., time required for the data to be reliably sensed and amplified in the row buffer, neutral networks are universal approximators and can still work very well if a system that is used to model the neutral networks has a high tolerance to errors.

The operation of the apparatus 300 can be described as follows (also referring to FIG. 2).

Before time t1, when the executor 310 is ready to execute the DL model 100, the analyzer 320 can generate the executing scheme 350, or get the executing scheme 350 from the second memory 340, and enable the DMA controller 360 to load the operators OP1 (e.g., the 3×3 convolution) and OP2 (e.g., the 1×1 convolution) from the first memory 330 to the second memory 340, which is, for example, sized to store at most two operators. For example, the analyzer 320 can control the estimator 321 to supply power, and the estimator 321 can enable the power controller 370 to power on the first memory 330 via executing power management A, then control the DMA controller 360 to load the operators OP1 and OP2 from the first memory 330 to the second memory 340, and enable the power controller 370 to power off the first memory 330.

At time t1, the executor 310 is going to inference the program (or model, e.g., the DL model 100) with the operator OP1 and then sends the signal (or information) to the analyzer 320. For example, the executor 310 starts executing the 3×3 convolution loaded on the second memory 340.

At time t2, the executor 310 has finished the execution of the DL model 100 with the operator OP1, and starts executing the DL model 100 with the operator OP2, which is also loaded along with the operator OP1 to the second memory 340 from the first memory 330 before time t1 and is already stored in the second memory 340. For example, the executor 310 starts executing the 1×1 convolution loaded on the second memory 340.

At time t3−Δt, when the executor 310 is still executing the DL model 100 with the operator OP2 (e.g., the 1×1 convolution), the analyzer 320 knows that, based on the executing scheme 350 and the signal (or information) sent from the executor 310, it is time to load the operators OP3 and OP4 from the first memory 330 to the second memory 340, in order to reduce the latency. For example, the estimator 321 can execute the power management A at time t3−Δt to power on, via the power controller 370, the first memory 330, then enable the DMA controller 360 to load the operators OP3 (e.g., the 3×3 DW convolution) and OP4 (e.g., the 1×1 convolution) from the first memory 330 to the second memory 340, and power off the first memory 330 at time t3. In an embodiment, only the 3×3 DW convolution is loaded from the first memory 330 to the second memory 340, as the 1×1 convolution is already loaded on the second memory 340.

At time t3, when the operators OP3 and OP4 are already stored in the second memory 340, the executor 310 can start executing the DL model 100 with the operator OP3 and then send the signal (or information) to the analyzer 320. For example, the executor 310 starts executing the 3×3 DW convolution loaded on the second memory 340.

At time t4, when the executor 310 has finished the execution of the DL model 100 with the operator OP3, the executor 310 can start executing the DL model 100 with the operator OP4, which is also loaded along with the operator OP3 to the second memory 340 from the first memory 330 before time t3 and is already stored in the second memory 340. For example, the executor 310 starts executing the 1×1 convolution loaded on the second memory 340 and sends the signal (or information) to the analyzer 320.

At time t5−Δt, when the executor 310 is still executing the DL model 100 with the operator OP4 (e.g., the 1×1 convolution), the analyzer 320 knows that, based on the executing scheme 350 and the signal (or information) sent from the executor 310, it is time to load the operator OP5 from the first memory 330 to the second memory 340, in order to reduce the latency. For example, the estimator 321 can execute the power management A at time t5−Δt to power on, via the power controller 370, the first memory 330 again, then enable the DMA controller 360 to load the operators OP5 (e.g., the FC) from the first memory 330 to the second memory 340, and power off the first memory 330 again at time t5.

At time t5, when the executor 310 has finished the execution of the DL model 100 with the operator OP4, the executor 310 can start executing the DL model 100 with the operator OP5, which is already loaded on the second memory 340, and then send the signal (or information) to the analyzer 320. For example, the executor 310 starts executing the FC loaded on the second memory 340.

At time t6, the executor 310 has finished the execution of the DL model 100 with the operator OP5.

As the next operators, with which the executor 310 executes the DL model 100, are already stored in the second memory 340 before the executor 310 finishes the execution of the DL model 100 with previous operators, the executor 310 can finish the execution of the DL model 100 with all the operators OP1 to OP5 at time t6, no additional latency being incurred. Besides, as the first memory 330 is powered on only during the loading of the operators from the first memory 330 to the second memory 340, the apparatus 300 consumes less energy, as compared to the prior art, in which the DRAM is always powered on and consumes power continuously.

As mentioned previously, a DL model can be segmented into multiple partitions and then distributed to heterogeneous hardware, such as general processors (e.g., CPUs) and dedicated hardware accelerators (e.g., mini DLAs and APUs), to accelerate DL computation by alleviating the resource cost of each of them.

Figure 4A:
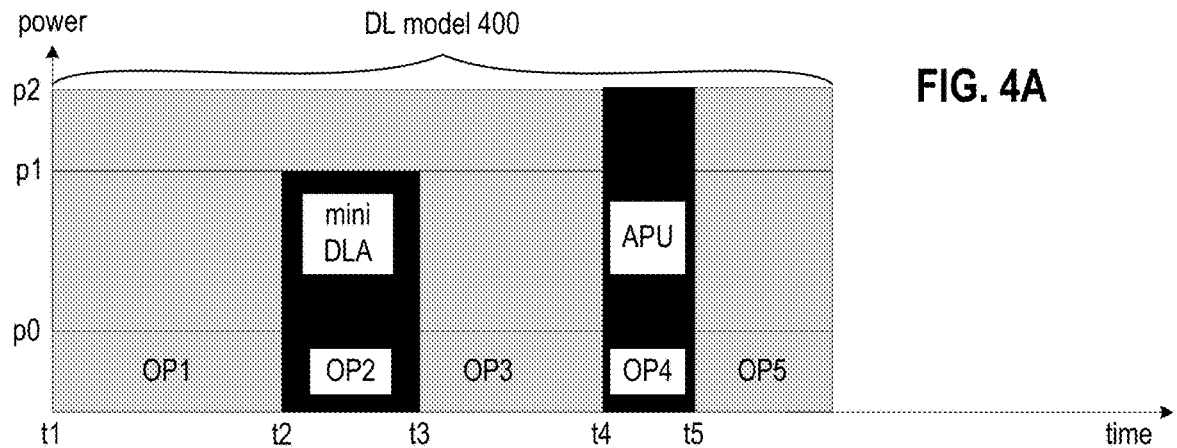
FIG. 4A is a power-timing diagram of exemplary hardware accelerators operating in a working mode.

FIG. 4A is a power-timing diagram of exemplary hardware accelerators, e.g., mini DLA and APU, operating in a working mode, during which the mini DLA and the APU consume power p1 and power p2, respectively. For example, a DL model 400, e.g., an auto-encoder model, involves a plurality of operators OP1 to OP5, in which the operators OP1, OP3 and OP5 are not complicated and can be performed by a general processor, e.g., a CPU, while the operators OP2 and OP4 are very computation-demanding and need to be performed by the dedicated mini DLA and the APU, respectively, to speed up the execution of the DL model 400.

However, these hardware accelerators, when powered on and operating in the working mode, consume a great amount of power. To address this issue, these hardware accelerators can be switched to operate in a standby mode when performing no DL computation, or be switched to operate in the working mode when performing DL computation.

Figure 4B:
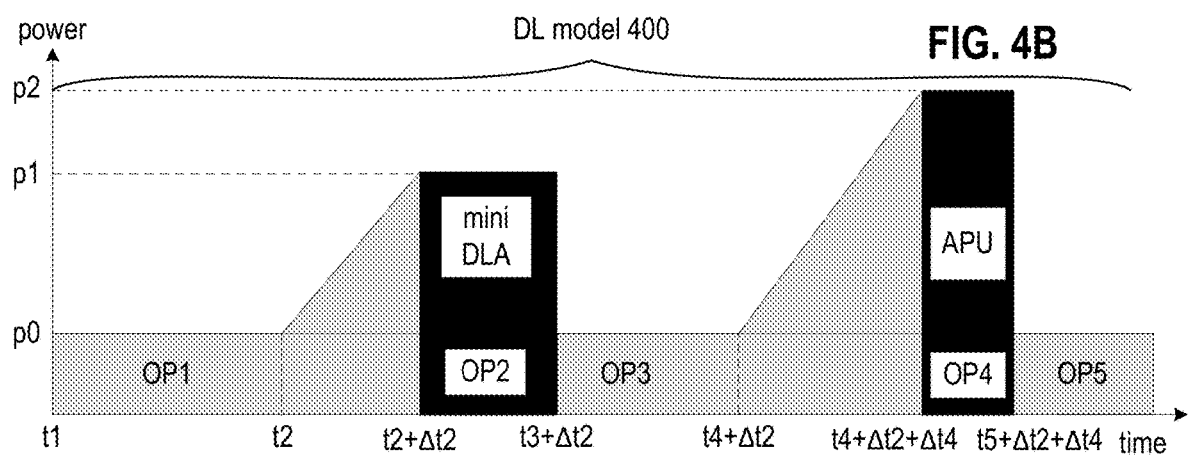
FIG. 4B is a power-timing diagram of the exemplary hardware accelerators switched to operate to the working mode from the standby mode.

FIG. 4B is a power-timing diagram of the exemplary hardware accelerators switched to operate to the working mode from the standby mode, during which the hardware accelerators consume lower power p0. The mini DLA and the APU, when operating in the working mode, consume higher power p1 and power p2, respectively. As it takes time, e.g., $\Delta t2$, for the lower power p0 to be increased to the higher power p1, the mini DLA starts to operate in the working mode at time $t2+\Delta t2$, thus incurring an overhead $\Delta t2$. Similarly, it takes time, e.g., $\Delta t4$, for the lower power p0 to be increased to the higher power p2, the APU cannot operate in the working mode until time $t4+\Delta t2+\Delta t4$.

Figure 5:
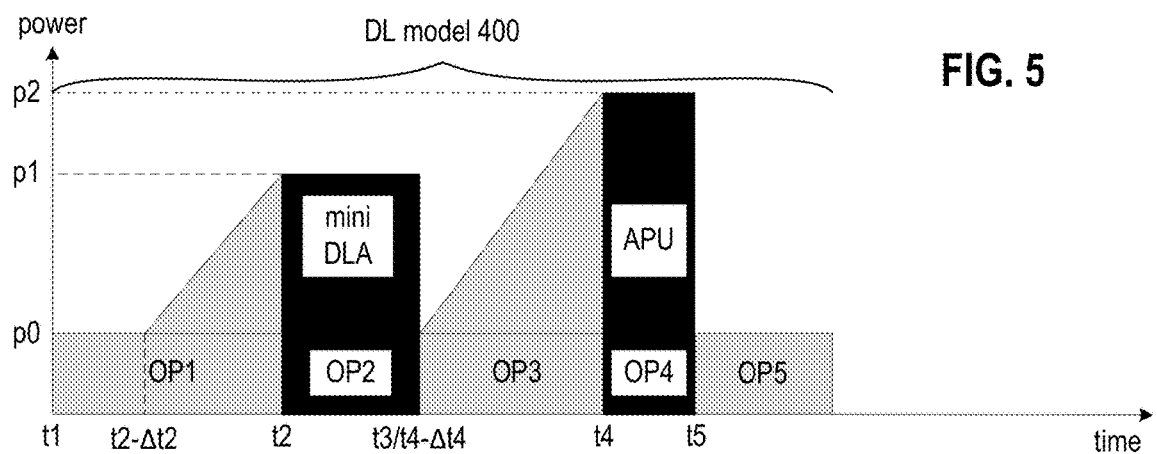
FIG. 5 is a power-timing diagram of the exemplary hardware accelerators, which are switched to operate from the standby mode to the working mode, according to some embodiments of the present disclosure.

FIG. 5 is a power-timing diagram of the exemplary hardware accelerators, e.g., the mini DLA and the APU, which are switched to operate from the standby mode to the working mode, according to some embodiments of the present disclosure. For example, when the mini DLA is scheduled to operate in the working mode at time t2, the mini DLA can be switched to operate from the standby mode to the working mode no later than time $t2-\Delta t2$. Therefore, the mini DLA is already in the working mode at time t2, the exact time when it is scheduled to perform the highly computation-demanding operator OP2. Similarly, the APU can be switched to operate from the standby mode to the working mode no later than time $t4-\Delta t4$, and be ready to operate at time t4, the exact time when it is scheduled to perform the highly computation-demanding operator OP4. In some other embodiments, the exemplary hardware accelerators can be switched to operate in the working mode or to be powered off.

Figure 6:
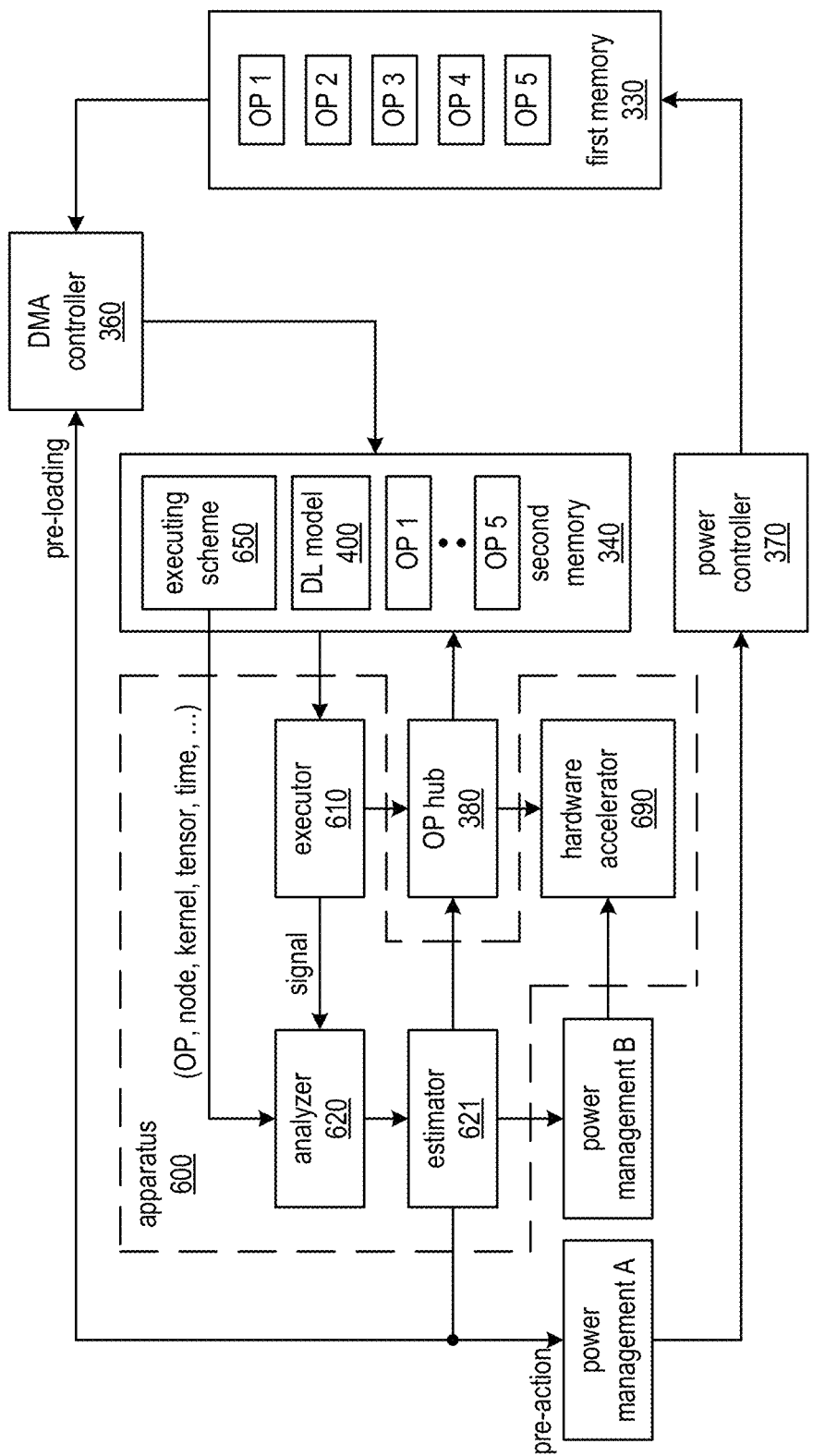
FIG. 6 is a functional block diagram of an exemplary apparatus for executing a program, e.g., the DL model 400 shown in FIG. 5, according to some embodiments of the present disclosure.

FIG. 6 is a functional block diagram of an exemplary apparatus 600 for executing a program (e.g., the DL model 400) according to some embodiments of the present disclosure. For example, the apparatus 600 can be a smartphone, a wearable or any IoT device. In an embodiment, the apparatus 600 can include an executor 610 (or a first executor, e.g., an inference executor), a hardware accelerator 690 (or a second executor), an analyzer 620 coupled to the executor 610, and an estimator 621 coupled to the analyzer 620 and the hardware accelerator. The executor 610, the analyzer 620 and the estimator 621 can be similar to the executor 310, the analyzer 320 and the estimator 321 of the apparatus 300, respectively.

In an embodiment, the analyzer 620 can be coupled between the first memory 330 and the second memory 340. In an embodiment, the first memory 330 can be used to store a program, such as the DL model 400 that involves the operators OP1 to OP5, which can be loaded to the second memory 340 for the executor 610 to execute. In an embodiment, all the operators OP1 to OP5 of the DL model 400 are already loaded from the first memory 330 and stored in the second memory 340, for simplifying the description of the operation of the exemplary apparatus 600.

In an embodiment, an executing scheme (or descriptor) 650 can also be stored in the second memory 340. For example, the executing scheme 650 can include a script, a rule, or a model. In an embodiment, the executing scheme 650 can be a script, and the analyzer 620 can be a script player. In another embodiment, the rule can generate a script for a certain layer of the program (e.g., the DL model 400) based on input tensors from a previous layer of the program. The analyzer 620 can control the estimator 621 to manage power supplied to the hardware accelerator 690, e.g., the mini DLA and the APU, based on the signal and the executing scheme 650. In an embodiment, the estimator 621 can manage, via power management B, the power supplied to the hardware accelerator 690 by switching the hardware accelerator 690 to operate between the standby mode and the working mode.

The operation of the apparatus 600 can be described as follows (also referring to FIG. 5).

Before time t1, when the executor 610 is ready to execute the DL model 400, the analyzer 620 can generate the executing scheme 650 or get the executing scheme 650 from the second memory 340.

At time t1, the executor 610, e.g., the CPU, starts to inference the program (or model, e.g., the DL model 400) with the operator OP1 and then sends the signal (or information) to the analyzer 620. For example, the executor 610 starts executing the DL model 400 with the operator OP1.

At time $t2-\Delta t2$, when the executor 610 is still executing the DL model 400 with the operator OP1, the analyzer 620 knows, based on the executing scheme 650 and the signal (or information) sent from the executor 610, that the DL model 400 is to be executed next with the operator OP2 and it is time to switch the hardware accelerator 690, e.g., the mini DLA, to operate from the standby mode to the working mode, which takes time Δt2. For example, the estimator 621 can execute the power management B to supply more power to the mini DLA to switch the mini DLA to operate in the working mode.

At time t2, when the executor 610 has finished the execution of DL model 400 with the operator OP1 and the mini DLA is already switched to operate in the working mode, the OP hub 380 can switch the operator OP2, with which the mini DLA is going to execute the DL model 400, and the executor 610 can enable the mini DLA to start executing the DL model 400 with the operator OP2 and send the signal to the analyzer 620.

At time t3, when the mini DLA has finished the execution of DL model 400 with the operator OP2, the estimator 621 can manage, via the power management B, power supplied to the mini DLA to switch the mini DLA to operate back in the standby mode, to save power, and the executor 610 starts executing the DL model 400 with the operator OP3.

At time t4−Δt4, which can be earlier than or at the same time as time t3, the analyzer 620 knows, based on the executing scheme 650 and the signal (or information) sent from the mini DLA, that the DL model 400 is to be executed next with the operator OP4 and it is time to switch the hardware accelerator 690, e.g., the APU, to operate from the standby mode to the working mode. For example, the analyzer 620 can execute the power management B to supply more power to the APU to switch the APU to operate in the working mode.

At time t4, when the executor 610 has finished the execution of the DL model 400 with the operator OP3 and the APU is already switched to operate in the working mode, the OP hub 380 can switch the operator OP4, with which the APU is going to execute the DL model 400, and the executor 610 can enable the APU to start executing the DL model 400 with the operator OP4 and send the signal to the analyzer 620.

At time t5, when the APU has finished the execution of DL model 400 with the operator OP4, the estimator 621 can manage, via the power management B, power supplied to the APU to switch the APU to operate back in the standby mode, to save power, and the executor 610 starts executing the DL model 400 with the operator OP5.

As the hardware accelerator 690 is already switched to operate in the working mode and ready to execute the DL model with the operators OP2 and OP4 before the executor 610 finishes the execution of the DL model 400 with the previous operators OP1 and OP3, no additional latency is incurred.

Figure 7:
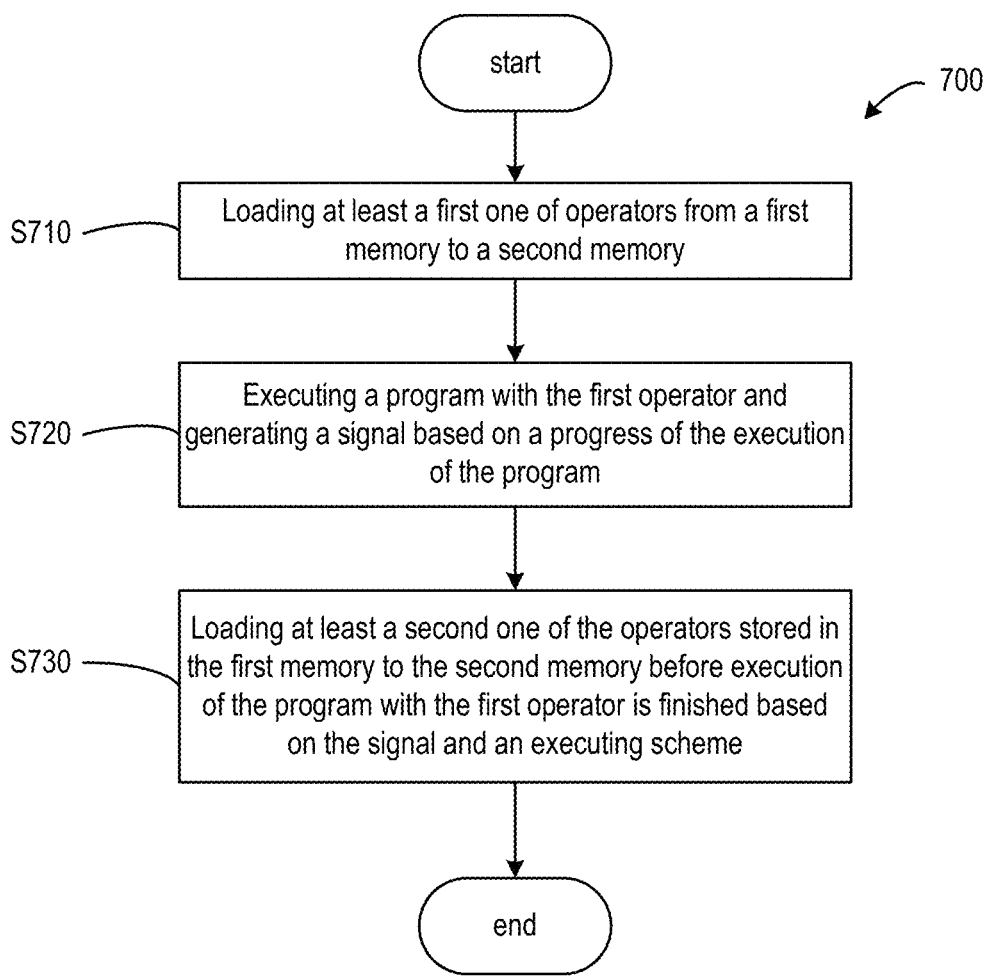
FIG. 7 is a flow chart illustrating an exemplary method for executing a program that involves a plurality of operators according to some embodiments of the present disclosure.

FIG. 7 is a flow chart illustrating an exemplary method 700 for executing a program that involves a plurality of operators according to some embodiments of the present disclosure. In various embodiments, some of the steps of the method 700 shown can be performed concurrently, in a different order than shown, can be substituted for by other method step, or can be omitted. Additional method steps can also be performed as desired. Aspects of the method 700 can be implemented by a smartphone, a wearable or any IoT device, such as the apparatuses 300 and 600 illustrated in and describe with respect to the preceding figures.

At step S710, at least a first one of the operators can be loaded from a first memory that stores the operators to a second memory. For example, the operators OP1 and OP2 can be loaded from the first memory 330 to the second memory 340.

At step S720, the program can be executed with the first operator loaded on the second memory, and a signal can be generated based on a progress of the execution of the program. For example, the executor 310 can execute the DL model 100 with the operators OP1 and OP2, and generate and send the signal (or information) to the analyzer 320.

At step S730, at least a second one of the operators stored in the first memory can be loaded to the second memory before execution of the program with the first operator is finished based on the signal and an executing scheme. For example, when the executor 310 is still executing the DL model 100 with the operator OP2, the analyzer 320 knows that, based on the executing scheme 350 and the signal (or information) sent from the executor 310, it is time to load the operators OP3 and OP4 from the first memory 330 to the second memory 340, in order to reduce the latency. In an embodiment, the power can be managed to be supplied to the first memory before the execution of the program with the first operator is finished based on the signal and the executing scheme. For example, the estimator 321 can execute the power management A at time t3−Δt to power on, via the power controller 370, the first memory 330, then enable the DMA controller 360 to load the operators OP3 and OP4 from the first memory 330 to the second memory 340, and power off the first memory 330 at time t3.

In an embodiment, the program can be executed with the first operator and the second operator by a first executor and a second executor, respectively. For example, the executor 610, e.g., a CPU, can execute the DL model 400 with the operators OP1 and OP3, and the hardware accelerator 690, e.g., the mini DLA or APU, can execute the DL model with the operators OP2 and OP4. In an embodiment, the power can be managed to be supplied to the second executor before the first executor finishes execution of the program with the first operator based on the signal from the first executor and the executing scheme. For example, the estimator 621 can manage the power, via the power management B, to be supplied to the hardware accelerator 690 by powering on/off the hardware accelerator 690, configuring an operation mode of the hardware accelerator 690, or scaling a voltage and/or a frequency applied to the hardware accelerator 690.

The apparatuses 300 and 600 can optionally include other components, such as input and output devices, additional or signal processing circuitry, and the like. Accordingly, the apparatuses 300 and 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for executing a program that involves a plurality of operators, comprising:
   an executor configured to execute the program with at least a first one of the operators loaded on a second memory from a first memory that stores the operators and to generate a signal based on a progress of the execution of the program with the first operator; and
   an analyzer coupled to the executor, the first memory and the second memory, the analyzer being configured to load at least a second one of the operators of the program next to the first operator stored in the first memory to the second memory before the executor finishes execution of the program with the first operator based on the signal from the executor and an executing scheme stored in the second memory.

2. The apparatus of claim 1, further comprising an estimator coupled to the analyzer, the first memory and the second memory, wherein the analyzer controls the estimator to manage power supplied to the first memory before the executor finishes execution of the program with the first operator based on the signal from the executor and the executing scheme stored in the second memory.

3. The apparatus of claim 2, wherein the estimator manages the power supplied to the first memory by powering on/off the first memory, configuring an operation mode of the first memory, or scaling a voltage and/or a frequency applied to the first memory.

4. The apparatus of claim 1, wherein the executing scheme includes a script, a rule, or a model.

5. The apparatus of claim 4, wherein the rule generates a script for a certain layer of the program based on input tensors from a previous layer of the program.

6. The apparatus of claim 1, wherein the signal includes an operation, a node identification (ID), a tensor, a kernel, and/or time of the program.

7. The apparatus of claim 1, wherein the second memory is a tightly-coupled memory (TCM) or a static random access memory (SRAM).

8. The apparatus of claim 1, wherein the first memory is a dynamic random access memory (DRAM), an on-bus SRAM, or a serial flash memory.

9. The apparatus of claim 1, wherein:
   the executor is a central processing unit (CPU) and the analyzer is a microcontroller unit (MCU) or a CPU exception, or
   the executor is a deep learning accelerator (DLA) and the analyzer is an MCU.

10. The apparatus of claim 1, wherein the analyzer and the executor are included on a single chip.

11. The apparatus of claim 1, further comprising a direct memory access (DMA) controller coupled to the analyzer, the first memory and the second memory, wherein the analyzer is further configured to instruct the DMA controller to load the second operator stored in the first memory to the second memory.

12. The apparatus of claim 1, wherein the executing scheme is man-made or created by an offline optimizer or an online/runtime optimizer.

13. An apparatus for executing a program that involves a plurality of operators, comprising:
   a first executor configured to execute the program with at least a first one of the operators and to generate a signal based on a progress of the execution of the program with the first operator;
   a second executor configured to execute the program with at least a second one of the operators next to the first operator; and
   an analyzer coupled to the first executor and the second executor, the analyzer being configured to manage power supplied to the second executor before the first executor finishes execution of the program with the first operator based on the signal from the first executor and an executing scheme.

14. The apparatus of claim 13, further comprising an estimator coupled to the analyzer and the second executor, the estimator being configured to manage the power supplied to the second executor by powering on/off the second executor, configuring an operation mode of the second executor, or scaling a voltage and/or a frequency applied to the second executor.

15. The apparatus of claim 13, wherein the second executor is DLA or an accelerated processing unit (APU).

16. A method for executing a program that involves a plurality of operators, comprising:
   loading at least a first one of the operators from a first memory that stores the operators to a second memory;
   executing the program with the first operator loaded on the second memory, and generating a signal based on a progress of the execution of the program; and
   loading at least a second one of the operators stored in the first memory to the second memory before execution of the program with the first operator is finished based on the signal and an executing scheme stored in the second memory.

17. The method of claim 16, further comprising:
   managing power supplied to the first memory before the execution of the program with the first operator is finished based on the signal and the executing scheme stored in the second memory.

18. The method of claim 16, wherein the first operator and the second operator are executed by a first executor and a second executor, respectively.

19. The method of claim 18, further comprising:
   managing power supplied to the second executor before the first executor finishes execution of the program with the first operator based on the signal from the first executor and the executing scheme.

20. The method of claim 19, wherein managing the power supplied to the second executor includes powering on/off the second executor, configuring an operation mode of the second executor, or scaling a voltage and/or a frequency applied to the second executor.

\* \* \* \* \*